US009353904B2

(12) United States Patent
Sun et al.

(10) Patent No.: US 9,353,904 B2
(45) Date of Patent: May 31, 2016

(54) ROTATABLE STAND

(71) Applicant: MYWISH INFORMATION CORP, Taipei (TW)

(72) Inventors: Wei Nien Sun, Taipei (TW); Sheng Wei Tsai, Taipei (TW)

(73) Assignee: MYWISH INFORMATION CORP., Taipei (TW)

( * ) Notice: Subject to any disclaimer, the term of this patent is extended or adjusted under 35 U.S.C. 154(b) by 0 days.

(21) Appl. No.: 14/708,282

(22) Filed: May 10, 2015

(65) Prior Publication Data

US 2016/0015168 A1  Jan. 21, 2016

(30) Foreign Application Priority Data

Jul. 17, 2014  (TW) .............................. 103212668 U (51) Int. Cl.
  *A47B 23/04*  (2006.01)
  *F16M 11/38*  (2006.01)
  *F16M 13/00*  (2006.01)
  *G06F 1/16*  (2006.01)

(52) U.S. Cl.
  CPC ................ *F16M 11/38* (2013.01); *A47B 23/04* (2013.01); *F16M 13/00* (2013.01); *G06F 1/16* (2013.01); *F16M 2200/024* (2013.01)

(58) Field of Classification Search
  CPC ........ A47B 23/00; A47B 23/04; F16M 11/38; F16M 13/00; F16M 2200/024; H05K 5/0204; G06F 1/16
  USPC .............. 248/441.1, 447, 454, 455, 460, 463, 248/465
  See application file for complete search history.

(56) References Cited

U.S. PATENT DOCUMENTS

| | | | | |
|---|---|---|---|---|
| 4,114,402 A | * | 9/1978 | Craig ....................... | F16C 11/12 464/78 |
| 4,253,260 A | * | 3/1981 | Maza ................... | G09F 15/0062 116/63 P |
| 4,796,369 A | * | 1/1989 | Hamann ............. | G09F 15/0062 116/63 P |
| 5,709,365 A | * | 1/1998 | Howard ............... | A47B 23/025 248/447.2 |
| 6,834,416 B2 | * | 12/2004 | Wang ........................ | B60P 1/43 16/266 |
| 7,216,789 B2 | * | 5/2007 | Caradimos .......... | B60R 11/0252 108/44 |
| 8,152,402 B2 | * | 4/2012 | Wylde .................... | F16M 11/38 248/528 |
| 8,172,191 B1 | * | 5/2012 | Zimbalatti ............. | F16M 11/10 16/266 |
| 8,220,767 B2 | * | 7/2012 | Lin ........................ | F16M 11/10 248/127 |
| 8,336,167 B2 | * | 12/2012 | Kim ..................... | H04M 1/0216 16/303 |
| 8,763,977 B2 | * | 7/2014 | Huang ................... | F16M 11/10 16/326 |
| 8,888,058 B2 | * | 11/2014 | Zaharakis .............. | F16M 11/22 248/176.1 |
| 9,062,811 B2 | * | 6/2015 | Yu .......................... | F16M 11/14 361/679.01 |
| 2003/0089832 A1 | * | 5/2003 | Gold ........................ | A45F 5/02 248/454 |
| 2003/0160138 A1 | * | 8/2003 | Rawlings ............... | F16M 11/02 248/176.3 |
| 2009/0279943 A1 | * | 11/2009 | Wylde .................... | F16M 11/38 403/83 |
| 2010/0213330 A1 | * | 8/2010 | Downing ............... | F16M 11/10 248/176.3 |
| 2010/0321255 A1 | * | 12/2010 | Kough ................. | H01Q 1/2266 343/702 |
| 2012/0006962 A1 | * | 1/2012 | Lin ........................ | F16M 11/10 248/372.1 |
| 2012/0091298 A1 | * | 4/2012 | Huang ................... | F16M 11/10 248/176.1 |
| 2012/0170212 A1 | * | 7/2012 | Gallouzi ............. | F16M 11/041 361/679.56 |

(Continued)

*Primary Examiner* — Rodney Mintz (57) ABSTRACT

A rotatable stand comprising a front body and a rear body. The front body has a containment slot, a connecting portion and a stopping portion, the rear body has an engaging portion, a positioning column and a hollow portion. The stopping portion of the front body further has a first positioning slot and a second positioning slot. By engaging the connecting portion of the front body and the engaging portion of the rear body, the positioning column of the rear body is capable of being rotated between the first positioning slot and the second positioning slot.

6 Claims, 8 Drawing Sheets

(56) References Cited

U.S. PATENT DOCUMENTS

| | | | |
|---|---|---|---|
| 2013/0068902 A1* | 3/2013 | Huang | F16M 11/10 248/188.8 |
| 2013/0155586 A1* | 6/2013 | Yu | F16M 11/14 361/679.01 |
| 2013/0181106 A1* | 7/2013 | Lin | F16M 11/10 248/463 |
| 2014/0063710 A1* | 3/2014 | Myung | H05K 5/0017 361/679.4 |
| 2014/0169853 A1* | 6/2014 | Sharma | G06F 3/0202 400/481 |
| 2014/0198441 A1* | 7/2014 | Sharma | G06F 1/1635 361/679.09 |
| 2014/0273590 A1* | 9/2014 | Sharma | G06F 1/1669 439/350 |
| 2014/0285960 A1* | 9/2014 | Sharma | G06F 1/1654 361/679.28 |
| 2014/0319304 A1* | 10/2014 | Kuan | F16M 11/2021 248/454 |
| 2015/0002994 A1* | 1/2015 | Kamepalli | G06F 1/1632 361/679.3 |
| 2015/0216063 A1* | 7/2015 | You | F16M 11/04 248/346.03 |

\* cited by examiner

ROTATABLE STAND

BACKGROUND OF THE INVENTION

1. Field of the Invention

The present invention relates to a rotatable stand, and more particularly to a rotatable stand which can be positioned.

2. Description of Prior Art

In modern life style, most of people have one or more than one portable electronic devices, which also creates numerous accessory products.

For example, a stand is a very popular accessory, which can allow the user to watch the device comfortable and hand-free. However, some stands are not universal for all different devices or itself is not portable.

Therefore, it is desirable to provide a rotatable stand to mitigate and/or obviate the aforementioned problems.

SUMMARY OF THE INVENTION

In order to achieve the above-mentioned objective, the present invention provides a rotatable stand has a front body and a rear body barrel body.

The front body has a containment slot, a connecting portion and a stopping portion. The rear body has an engaging portion, a positioning column and a hollow portion. The stopping portion of the front body further has a first positioning slot and a second positioning slot. By engaging the connecting portion of the front body and the engaging portion of the rear body, the positioning column of the rear body capable of being rotated between the first positioning slot and the second positioning slot.

Other objects, advantages, and novel features of the invention will become more apparent from the following detailed description when taken in conjunction with the accompanying drawings.

DETAILED DESCRIPTION OF THE INVENTION

Figure 1:
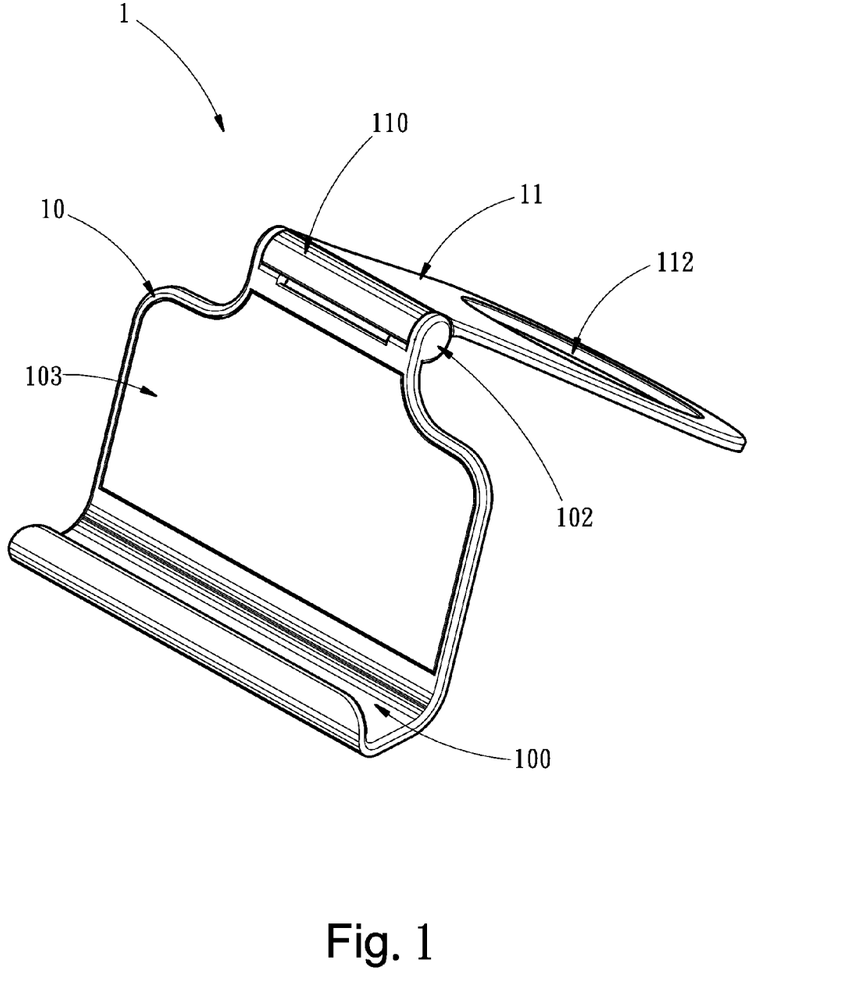
FIG. 1 is a perspective drawing of a rotatable stand according to an embodiment of the present invention.
Figure 2:
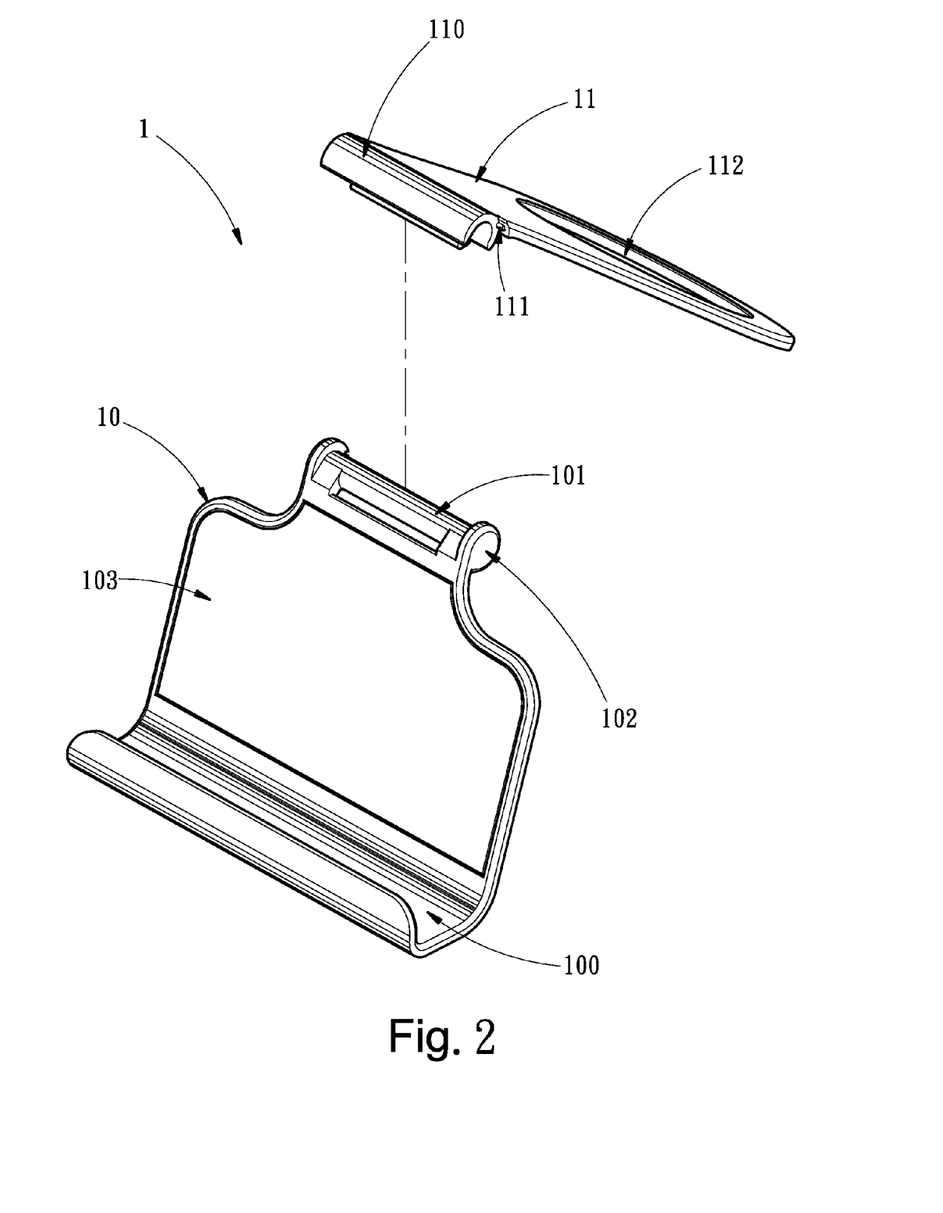
FIG. 2 is an exploded view of the rotatable stand according to the embodiment of the present invention.

Please refer to FIG. 1 and FIG. 2. A stand 1 comprises a front body 10 and a rear body 11. The front body 10 has a similar J shape which includes a bended containment slot 100 at one end and a connecting portion 101 with two stopping portions 102 at each ends at another end. A back portion 103 is disposed between the connecting portion 101 and the containment slot 100. The connecting portion 101 correspondingly engages with an engaging portion 110 of the rear body 11.

The rear body 11 has a hollow out portion 112 at its surface and the engaging portion 110 at an end. A positioning column 111 is disposed at each end of the engaging portion 110, the engaging portion 110 is capable of engaging with the connecting portion 101 of the front body 10. When the front body 10 engages with the rear body 11, the stand 1 can be rotated to open or close.

Figure 3:
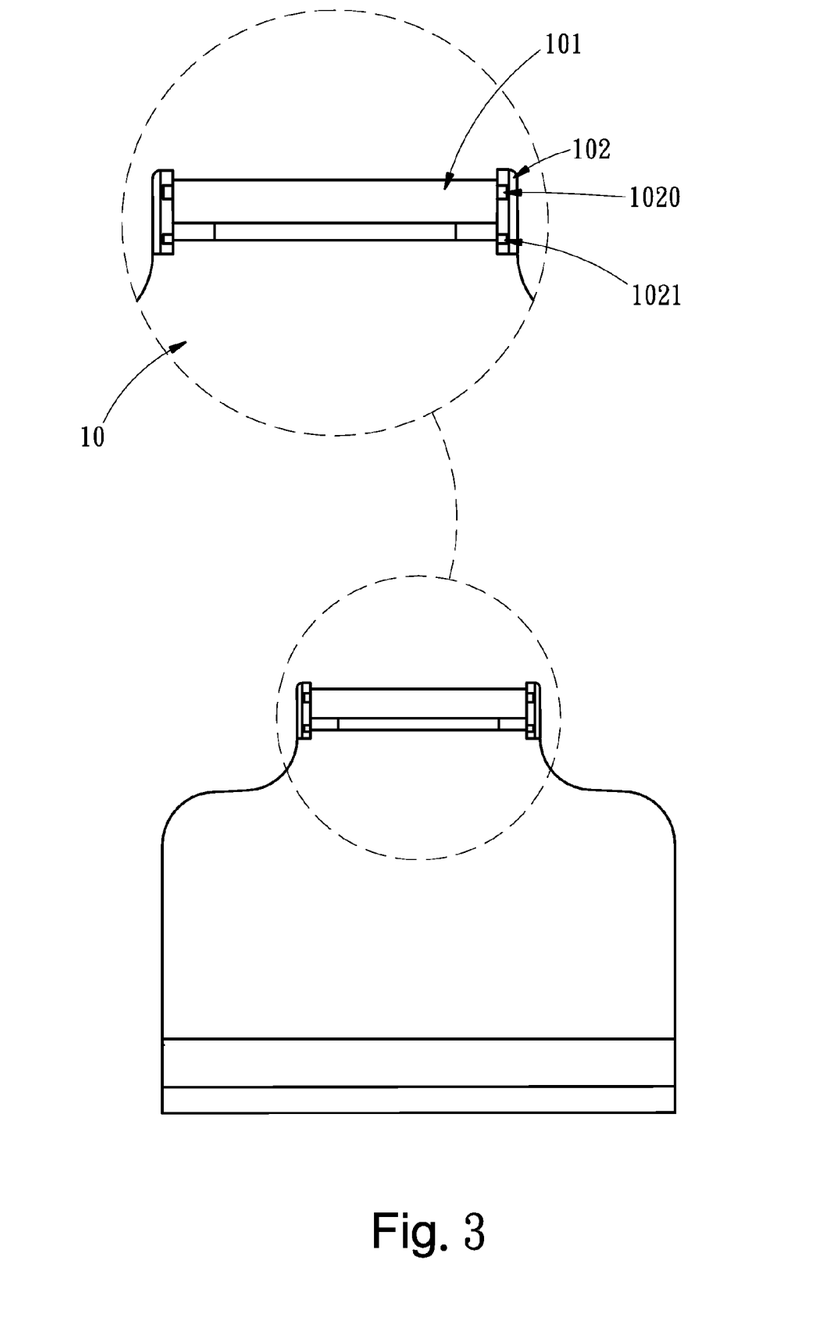
FIG. 3 is a schematic drawing of a front body of a connecting portion of the rotatable stand according to the embodiment of the present invention.
Figure 4:
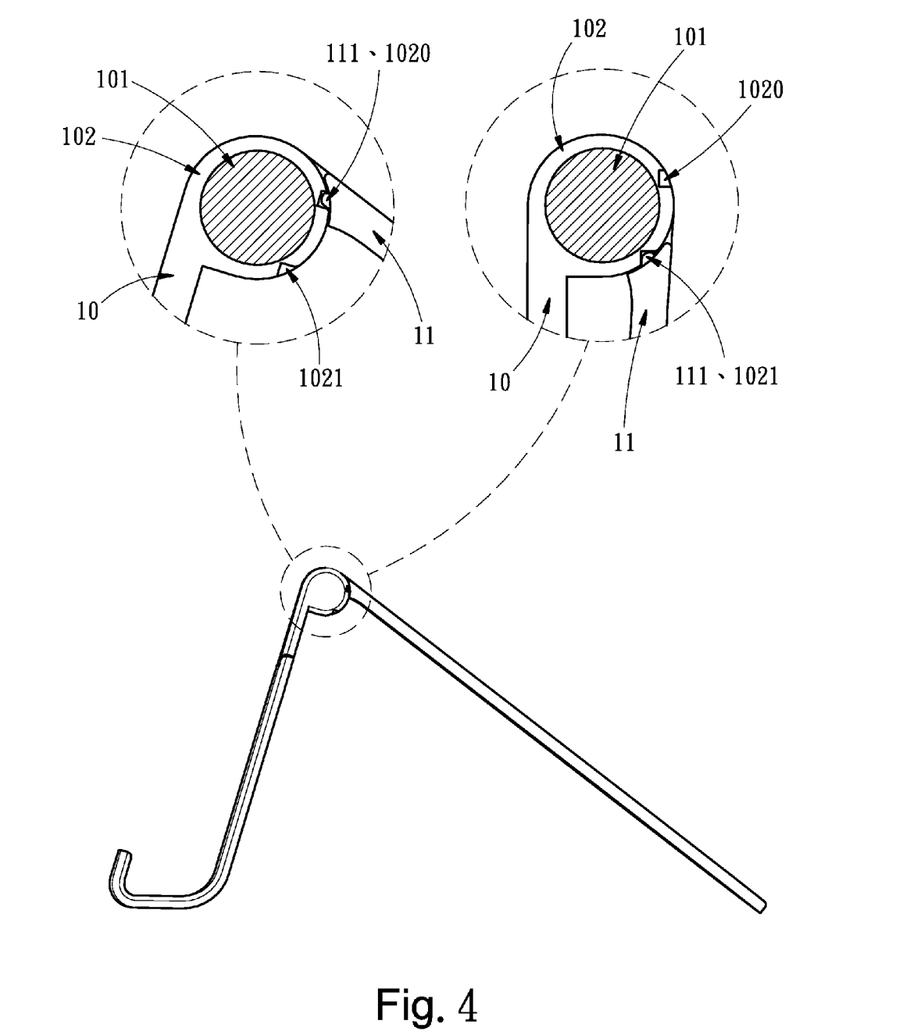
FIG. 4 shows the rotatable stand being rotated.

Please refer FIG. 3 and FIG. 4. The connecting portion 101 of the front body 10 further has the stopping portion 102 with a larger diameter at two ends of the connecting portion 101, and a first positioning slot 1020 and a second positioning slot 1021 are separately disposed on a circular side of the stopping portion 102 at a predetermined location. The first positioning slot 1020 and the second positioning slot 1021 are configured for corresponding to the positioning column 111 of the rear body 11.

The first positioning slot 1020 and the second positioning slot 1021 are separated from each other, when the engaging portion 110 of the rear body 11 engages with the connecting portion 101 of the front body 10, the positioning column 111 of the rear body 11 are inserted into the two stopping portion 102 of the connecting portion 101 of the front body 10.

Therefore, When the front body 10 and the rear body 11 are opened apart, the rear body 11 is rotated to insert the positioning column 111 into the first positioning slot 1020 of the stopping portion 102 of the front body 10, to prevent the stand 1 from moving or shaking.

When the front body 10 and the rear body 11 are closed together, the rear body 11 is rotated to insert the positioning column 111 into the second positioning slot 1021 of the second positioning slot 1021, to collapse the stand 1 securely.

Figure 5:
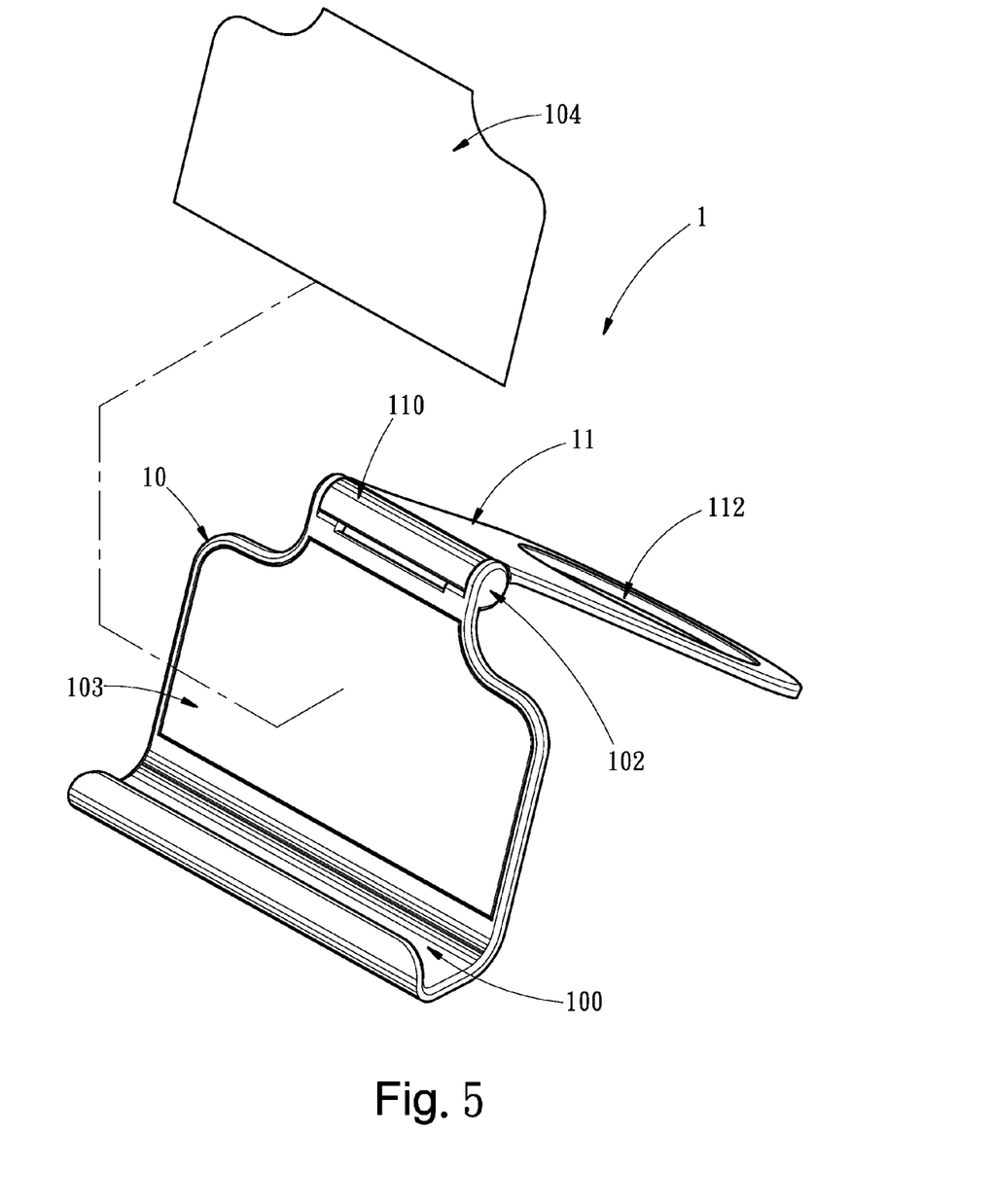
FIG. 5 is a schematic drawing of a back portion of the front body of the rotatable stand according to the embodiment of the present invention.
Figure 6:
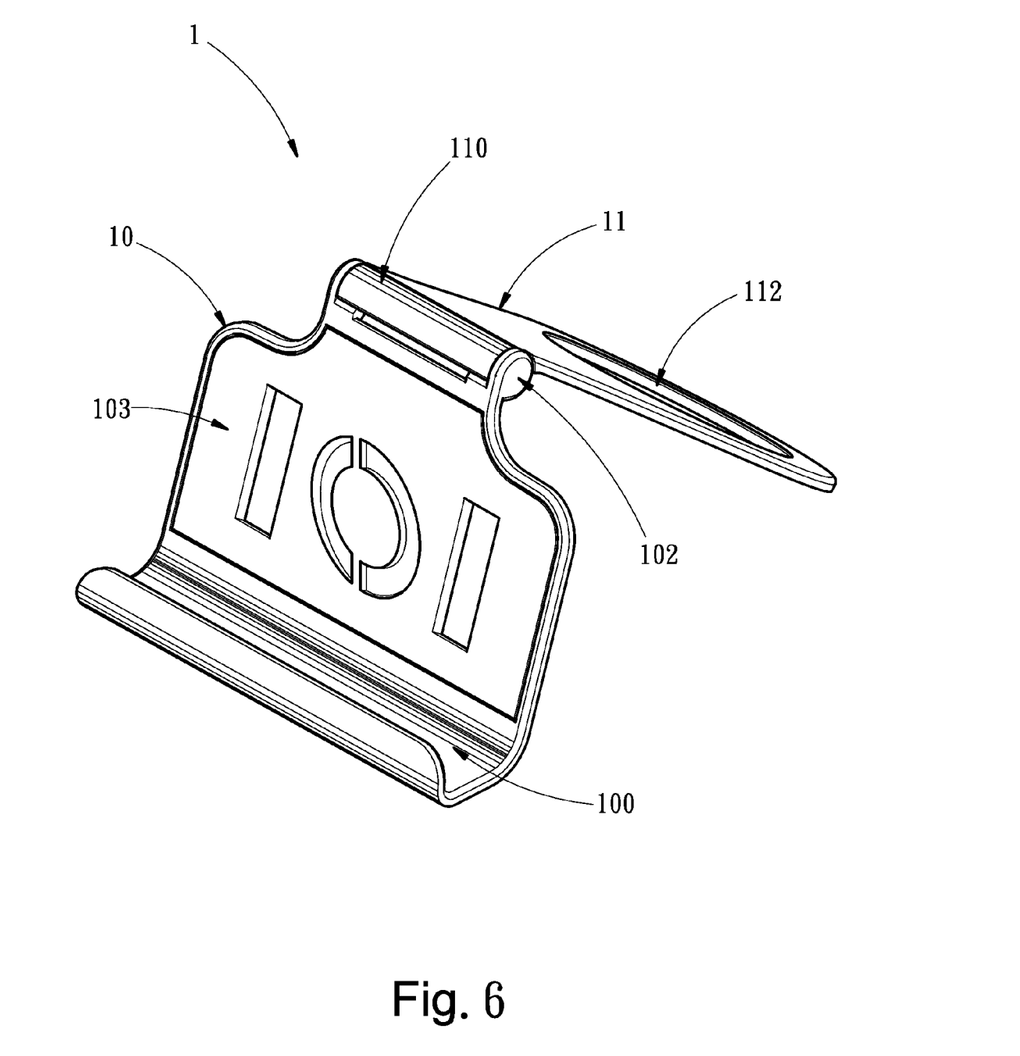
FIG. 6 is another schematic drawing of the back portion of the front body of the rotatable stand according to the embodiment of the present invention.

Please refer FIG. 5 and FIG. 6. The front body 10 of the stand 1 has a back portion 103, and the back portion 103 is configured for accepting ornamental object 104 which can be printed or adhered with various designs.

Furthermore, the stopping portion 103 can also has hollow out portions for various designs.

Figure 7:
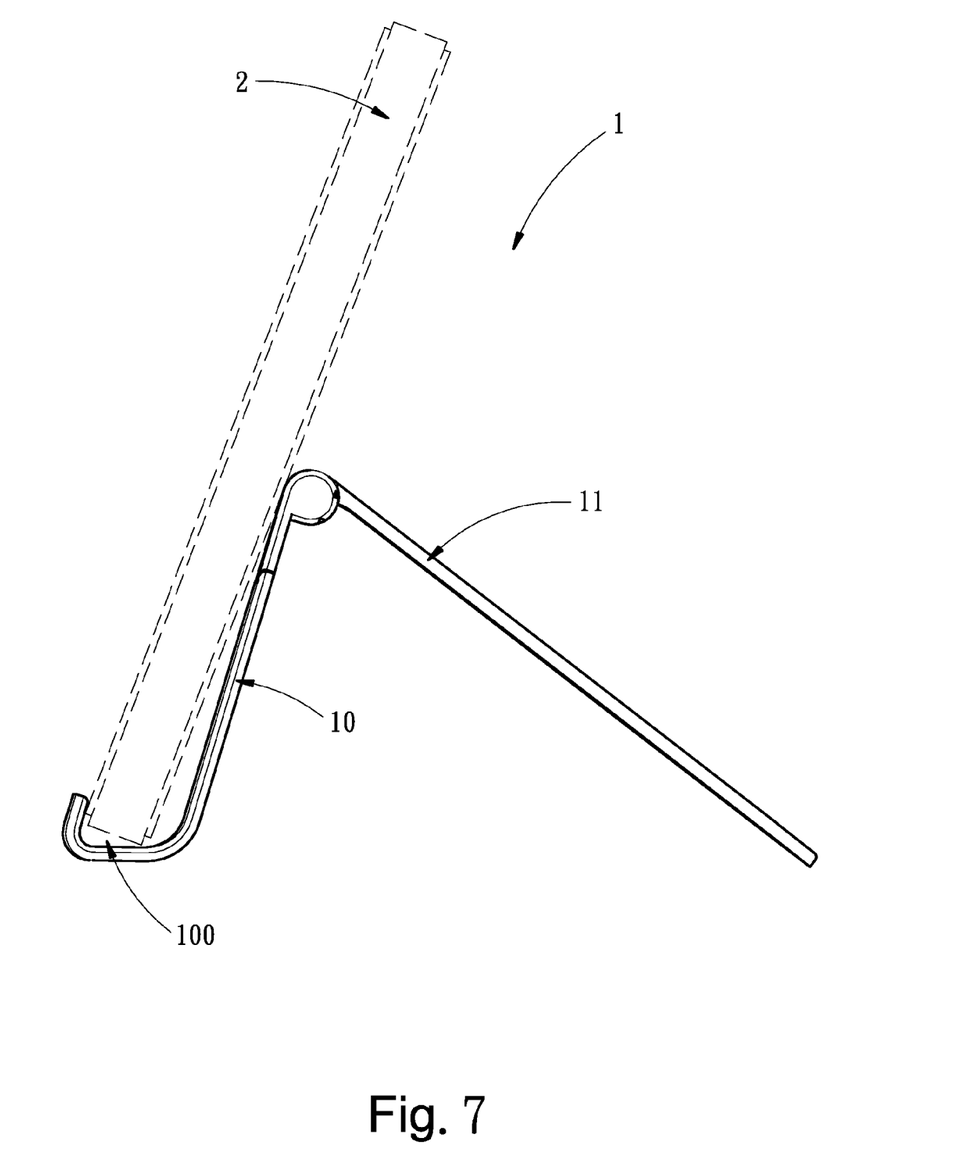
FIG. 7 is another schematic drawing of the rotatable stand according to another embodiment of the present invention.
Figure 8:
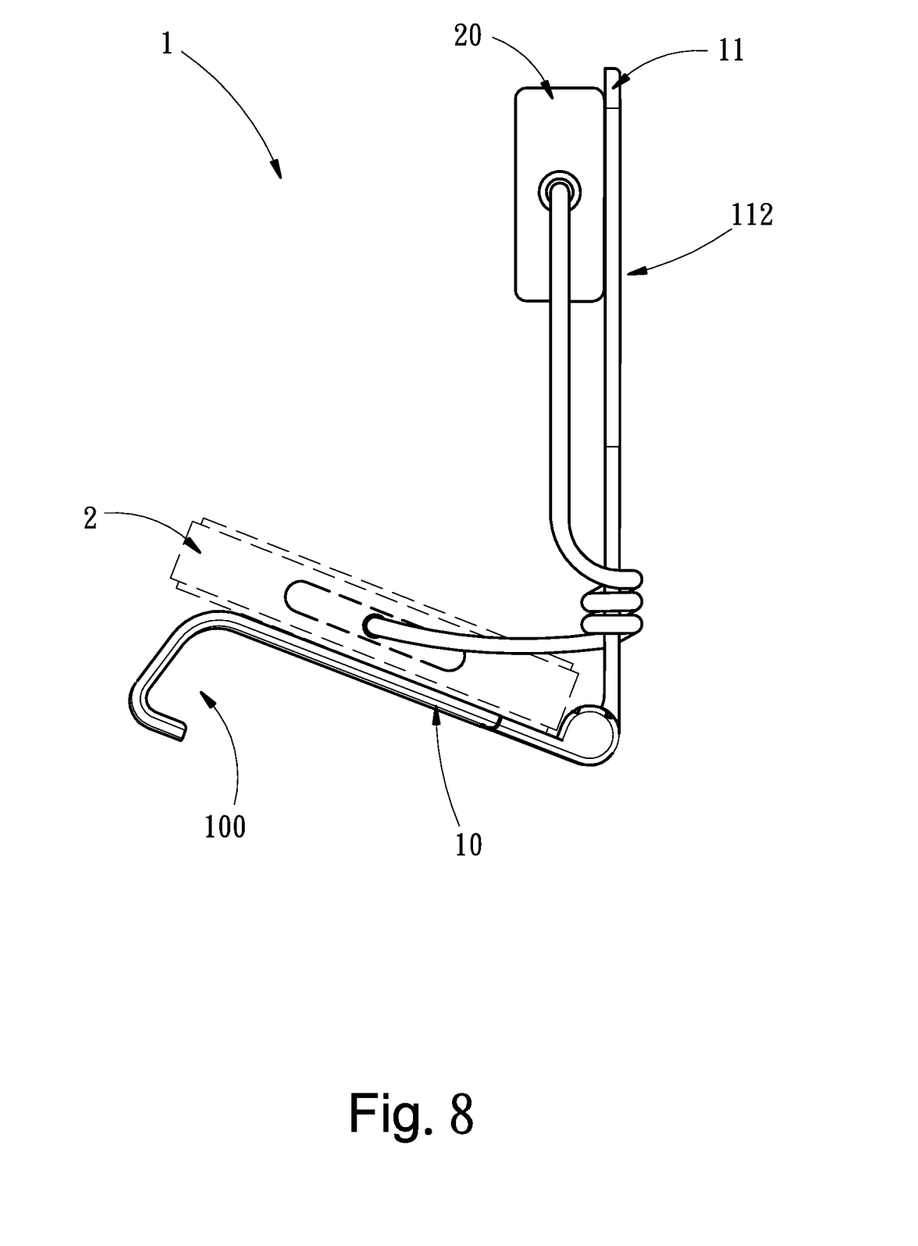
FIG. 8 is another schematic drawing of the rotatable stand according to another embodiment of the present invention.

Please refer FIG. 7 and FIG. 8. The stand 1 is opened as a triangle shape, the containment slot 100 of the front body 10 is configured for accepting a portable device 2. Alternatively, by turning the stand 1 upside down, the portable device 2 can also be place on the stand 1 while it is charging. The portable device 2 is placed on a back side of the front body 10 and connected to a power charger 20, the adapter 20 is wrapped around the rear body 112 and plugged on a power socket through the hollow out portion 112 of the rear body 11, and the rear body 11 is hanged on adapter 20.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A rotatable stand comprising a front body and a rear body, characterized in that:
   the front body has a containment slot, a connecting portion and a stopping portion extending radially above the connecting portion;
   the rear body has an engaging portion detachably and rotationally engaging the connecting portion, the rear body further including a positioning column extending axially from the engaging portion and a hollow portion;

wherein the stopping portion of the front body further comprises a first positioning slot and a second positioning slot extending axially through at least a portion of the stopping portion, and by said rotationally engaging the connecting portion of the front body and the engaging portion of the rear body, the positioning column of the rear body is capable of being rotated between the first positioning slot and the second positioning slot.

2. The rotatable stand as claimed in claim 1, wherein the containment slot of the front body is configured to accept a portable electronic device.

3. The rotatable stand as claimed in claim 1, wherein the front body further comprises a back portion.

4. The rotatable stand as claimed in claim 3, wherein the stand is capable of holding a portable electronic device while the portable electronic device is charging.

5. The rotatable stand as claimed in claim 3, wherein the back portion is adhered or printed with an ornamental object.

6. The rotatable stand as claimed in claim 3, wherein the back portion comprises an ornament design.

\* \* \* \* \*